United States Patent
Zhang et al.

(10) Patent No.: US 7,836,786 B2
(45) Date of Patent: Nov. 23, 2010

(54) FLAT TYPE WAVE GEAR DEVICE

(75) Inventors: Xin Yue Zhang, Azumino (JP); Keiji Ueura, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 429 days.

(21) Appl. No.: 11/971,505

(22) Filed: Jan. 9, 2008

(65) Prior Publication Data
US 2008/0173130 A1     Jul. 24, 2008

(30) Foreign Application Priority Data
Jan. 24, 2007    (JP) .............................. 2007-013219

(51) Int. Cl.
*F16H 55/14*     (2006.01)
(52) U.S. Cl. .......................................... 74/461; 74/640
(58) Field of Classification Search ................... 74/461, 74/640
See application file for complete search history.

(56) References Cited

U.S. PATENT DOCUMENTS 5,123,300 A * 6/1992 Himmelein et al. ............ 74/640
5,934,157 A * 8/1999 Kobayashi et al. ............ 74/640

FOREIGN PATENT DOCUMENTS

| JP | 2-91238 U | 7/1990 |
| JP | 5-172195 A | 7/1993 |
| JP | 8-166052 A | 6/1996 |

* cited by examiner

*Primary Examiner*—David D Le
*Assistant Examiner*—Justin Holmes
(74) *Attorney, Agent, or Firm*—Buchanan, Ingersoll & Rooney PC

(57) ABSTRACT

A flat type wave gear device is realized having a much improved load capacity. When d is an amount of radial flexing at a major axis location of a rim neutral circle of the flexible external gear of a flat type wave gear device flexed into an elliptical shape and t is the rim thickness of the flexible external gear, then $$(0.5237 \operatorname{Ln}(R)-1.32)d \leq t \leq (0.8728 \operatorname{Ln}(R)-2.2)d$$

when the reduction ratio R of the wave gear device is less than 80, and $$(1.5499 \operatorname{Ln}(R)-5.8099)d \leq t \leq (2.5832 \operatorname{Ln}(R)-9.6832)d$$

when the reduction ratio R of the wave gear device is 80 or more. Using this setting makes it possible to increase the tooth root fatigue limit strength of the flexible external gear, thereby making it possible to improve the load capacity of the flexible external gear.

2 Claims, 6 Drawing Sheets

FLAT TYPE WAVE GEAR DEVICE

TECHNICAL FIELD

The present invention relates to a flat type wave gear device equipped with an annular flexible gear with external teeth, and more particularly, to an improved technology for increasing the tooth root strength with the object of increasing the load capacity of the flat type wave gear device.

BACKGROUND ART

A wave gear device is equipped with a rigid internal gear, a flexible external gear disposed inside the rigid internal gear, and a wave generator that flexes the flexible external gear into an elliptical shape, causing it to partially mesh with the rigid internal gear. When the wave generator is rotated by a motor or the like, the position at which both gears mesh moves circumferentially, generating a reduced-speed relative rotation between the two gears that corresponds to the difference in the number of the two gears' teeth. By fixing one gear so that it does not rotate, it is possible to output and transmit reduced-speed rotation from the other gear to the load side.

Depending on the shape of the flexible external gear, wave gear devices can be classified into flat types, cup types and silk-hat types. As shown in FIG. 6, a flat type wave gear device 1 has two annular rigid internal gears 2 and 3 disposed coaxially in parallel, an annular flexible external gear 4 disposed inside the rigid internal gears 2 and 3, and a wave generator 5 for flexing the flexible external gear 4 into an elliptical shape to partially mesh it with the rigid internal gears 2 and 3 and for moving the meshing position circumferentially.

Here, the fixed rigid internal gear 2 has the same number of teeth as the flexible external gear 4, and the other rigid internal gear 3 has 2n (n being a positive integer) more teeth than the flexible external gear 4. Or, the fixed rigid internal gear 2 has 2n more teeth than the flexible external gear 4 and the other rigid internal gear 3 has the same number of teeth as the flexible external gear 4.

Rotating the wave generator 5 generates relative rotation between the rigid internal gear 3 and the flexible external gear 4 that is much slower than the rotation of the wave generator 5, and this reduced rotation is output from the rigid internal gear 3 to the output side.

The design of a flat type wave gear device thus configured is more compact and simple than a cup type or silk-hat type one. Flat, cup and silk-hat type wave gear devices are disclosed by, for example, Patent References 1, 2 and 3, respectively.

[Patent Reference 1] JP 05-172195 A
[Patent Reference 2] JP 08-166052 A
[Patent Reference 3] JP 02-912382 A Compared to other types such as the cup and silk-hat types, the utility of a flat type wave gear device is limited by its small load capacity.

The flexible external gear transmits the load in engagement with the rigid internal gears as it is elliptically deformed by the elliptical shape of the wave generator inserted therein. Therefore, in order to increase the load capacity it is necessary to increase the tooth root strength. An important element in determining the tooth root strength is the rim thickness of the flexible external gear. However, previously there have been no studies relating to design optimization of the rim thickness of the flexible external gear of a flat type wave gear device.

DISCLOSURE OF THE INVENTION

In view of the foregoing, the purpose of the present invention is to endeavor to optimize the rim thickness of the flexible external gear to greatly improve the load capacity of the flat type wave gear device.

The present inventors made it possible to more than double the previous fatigue strength of the tooth root of the flexible external gear by obtaining the optimal rim thickness of the flexible external gear produced by the bending deformation by the elliptically shaped wave generator and the tensile deformation due to load torque, and by setting a suitable hardness for the material of the flexible external gear.

That is, according to the present invention, there is provided a flat type wave gear device having an annular rigid internal gear, an annular flexible external gear disposed inside the rigid internal gear, and a wave generator for flexing the flexible external gear into an elliptical shape to cause it to partially mesh with the rigid internal gear and for circumferentially moving the position at which the gears mesh, characterized in that:

when d is an amount of radial flexing at a major axis location of a rim neutral circle of the flexible external gear flexed into an elliptical shape and t is rim thickness of the flexible external gear, then $$(0.5237 \, Ln(R) - 1.32)d \leq t \leq (0.8728 \, Ln(R) - 2.2)d$$

when reduction ratio R of the wave gear device is less than 80, and $$(1.5499 \, Ln(R) - 5.8099)d \leq t \leq (2.5832 \, Ln(R) - 9.6832)d$$

when reduction ratio R of the wave gear device is 80 or more. Ln means a natural logarithm whose base is Napier's constant e. Thus, $Ln(x) = \log_e(x)$.

The present invention is also characterized in that the flexible external gear has a material hardness HRC value within a range 40~50.

In accordance with this invention, it is possible to increase the tooth root strength by optimizing the rim thickness of the flexible external gear of the flat type wave gear device subjected to bending deformation and tensile deformation. It is also possible to greatly increase the tooth root strength by optimizing the rim thickness of the flexible external gear and optimizing the hardness of the material thereof. As a result, in accordance with this invention, it is possible to realize a flat type wave gear device having a much higher load capacity than before.

BEST MODE FOR CARRYING OUT THE INVENTION

Details of the present invention are described below, with reference to the drawings.

Figure 1:
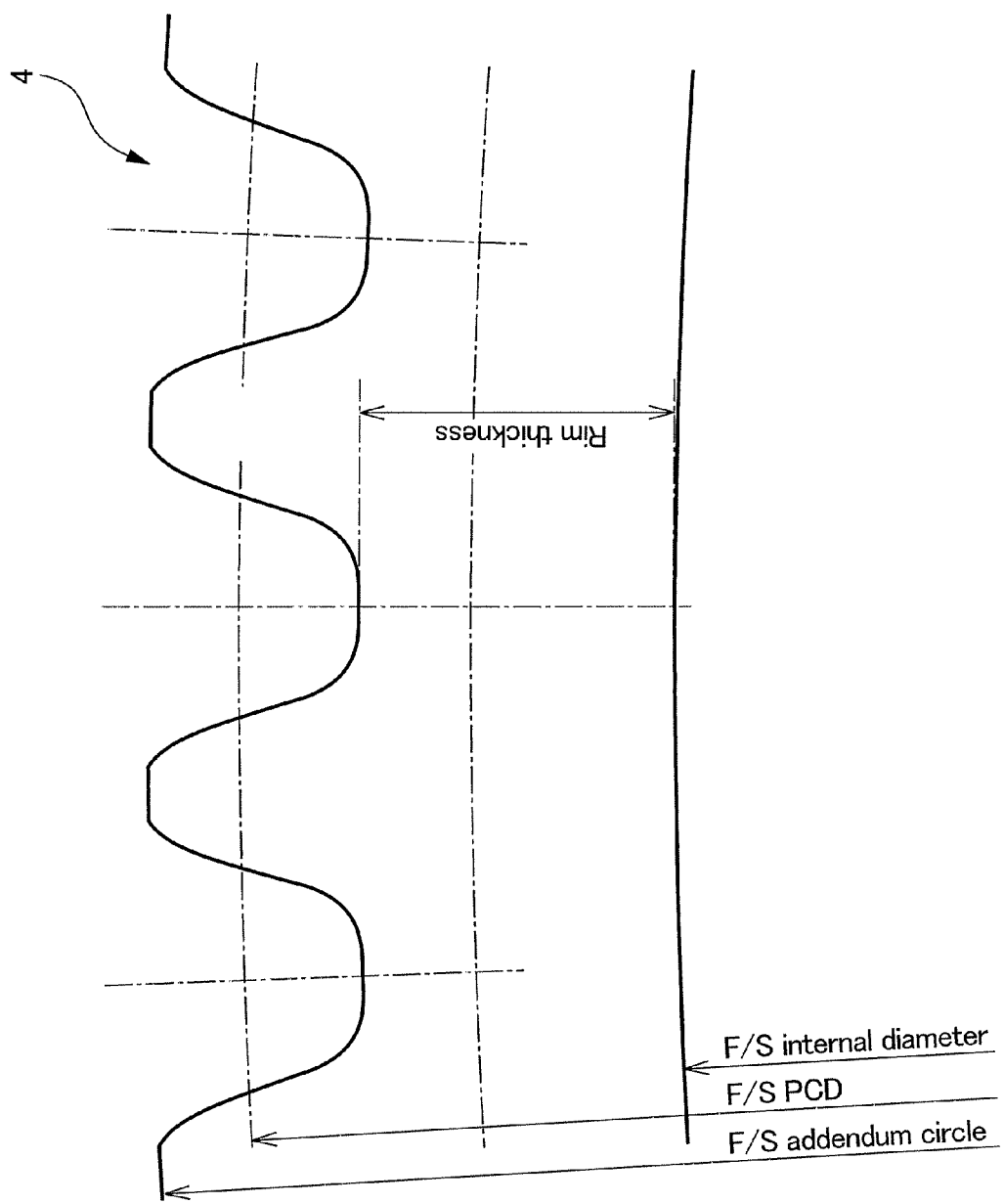
FIG. 1 is a schematic diagram showing the rim thickness of a flat type wave gear device.
Figure 6:
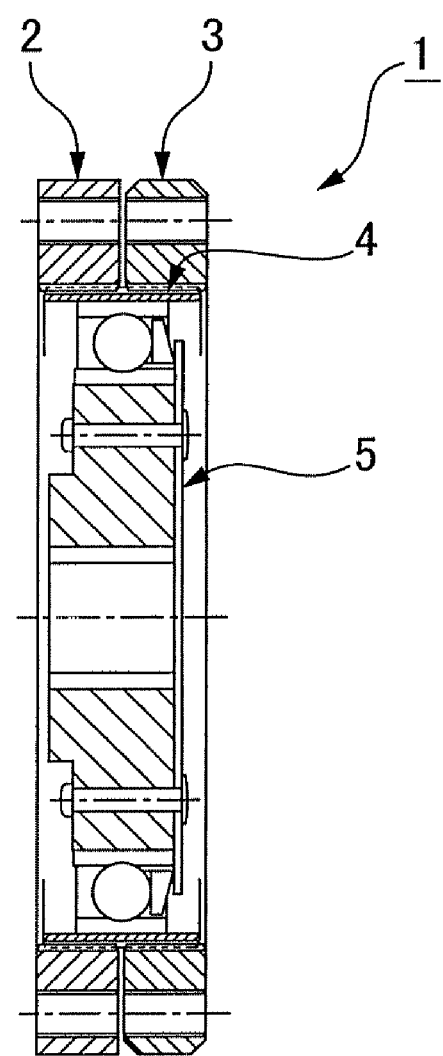
FIG. 6 is a general sectional view of a flat type wave gear device.

FIG. 6 shows the configuration of a flat type wave gear device to which the present invention may be applied. FIG. 1 is a conceptual diagram showing the rim thickness of an annular flexible external gear (F/S) 4 of the flat type wave gear device 1; in the diagram, the rim thickness is the thickness of the portion denoted by t. Also, the radial flexing amount d of the flexible external gear 4 flexed into an elliptical shape by the wave generator 5, is the amount of radial flexing at a major axis location on the rim neutral circle thereof. With n being the difference between the number of teeth of the flexible external gear 4 and rigid internal gear 3 and m being the module of the flexible external gear 4, this radial flexing amount d is d=mn.

Figure 2:
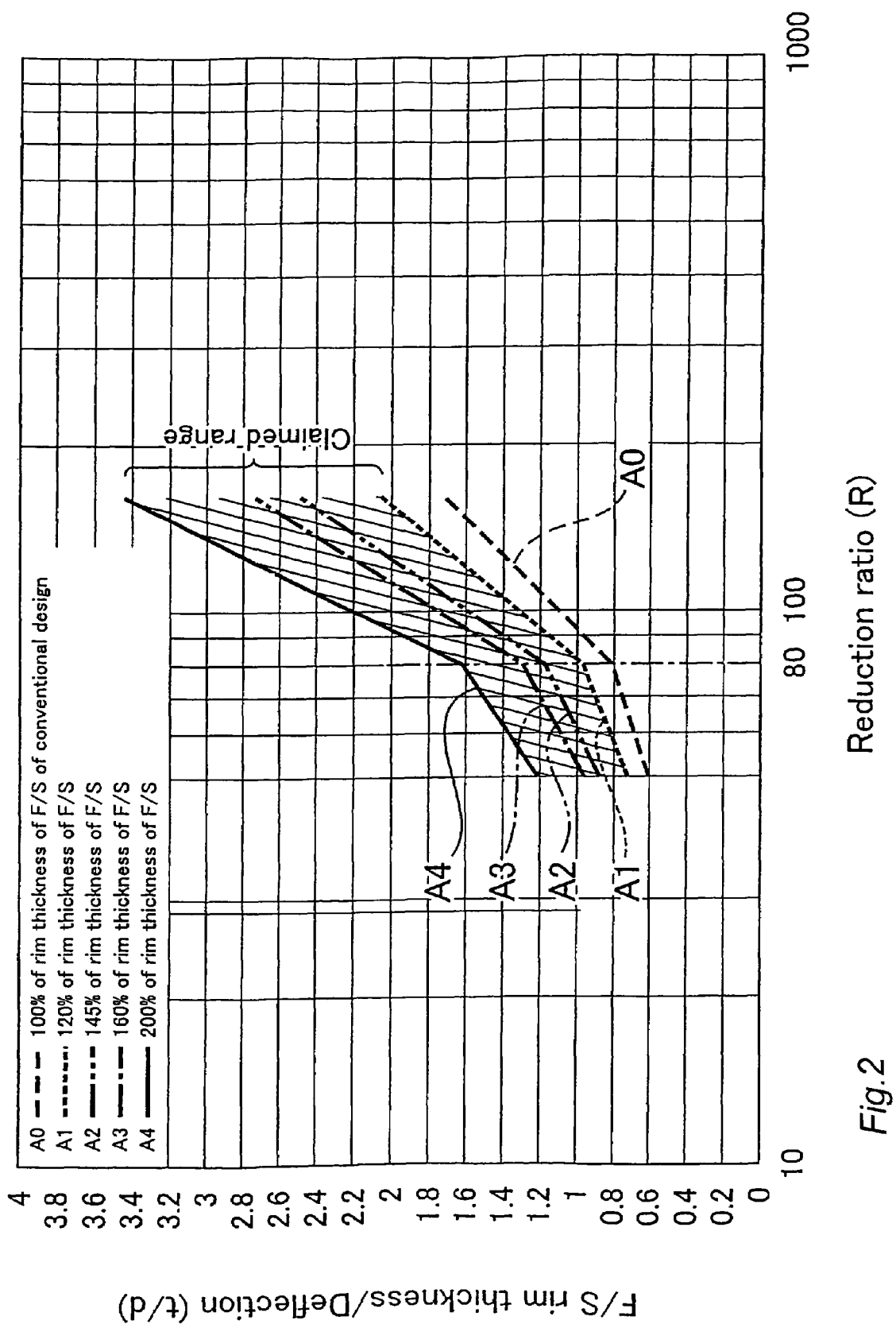
FIG. 2 is a graph showing the relationship between the ratio of rim thickness and radial flexing amount relative to the reduction ratio.

FIG. 2 is a graph showing the rim thickness prescribed by the present invention, and the rim thickness of the flexible external gear (F/S) of an ordinary conventional flat type wave gear device. In this graph, the horizontal axis is the reduction ratio R of the flat type wave gear device, and the vertical axis is the ratio t/d of rim thickness t and radial flexing amount d.

In this graph, the broken line A0 shows the relationship between the reduction ratio and rim thickness of the flexible external gear in a conventional flat type wave gear device. In contrast, broken lines A1 to A4 show the relationship between the reduction ratio and the rim thickness of the flexible external gear prescribed in accordance with the present invention. With respect to the conventional design value to of the rim thickness denoted by the broken line A0, broken lines A1 to A4 represent rim thickness increases of 20%, 45%, 60% and 100%, respectively.

Here, with broken line A1 prescribing the lower limit of the rim thickness t, (Equation 1) expresses the part of the reduction ratio that is less than 80, and (Equation 2) expresses the part of the reduction ratio that is 80 or more.

$$t/d = 0.5237 \ln(R) - 1.32 \tag{Equation 1}$$

$$t/d = 1.5499 \ln(R) - 5.8099 \tag{Equation 2}$$

Also, with broken line A4 prescribing the upper limit of the rim thickness t, (Equation 3) expresses the part of the reduction ratio that is less than 80, and (Equation 4) expresses the part of the reduction ratio that is 80 or more.

$$t/d = 0.8728 \ln(R) - 2.2 \tag{Equation 3}$$

$$t/d = 2.5832 \ln(R) - 9.6832 \tag{Equation 4}$$

Therefore, in the graph the portion indicated by the slanting lines is the range of the rim thickness t according to the present invention, the range of the rim thickness according to the present invention being within the range of approximately 120%~200% of the rim thickness of the conventional design model.

Next, the critical meaning of the upper and lower limits of the rim thickness t according to the invention will be explained.

Figure 3:
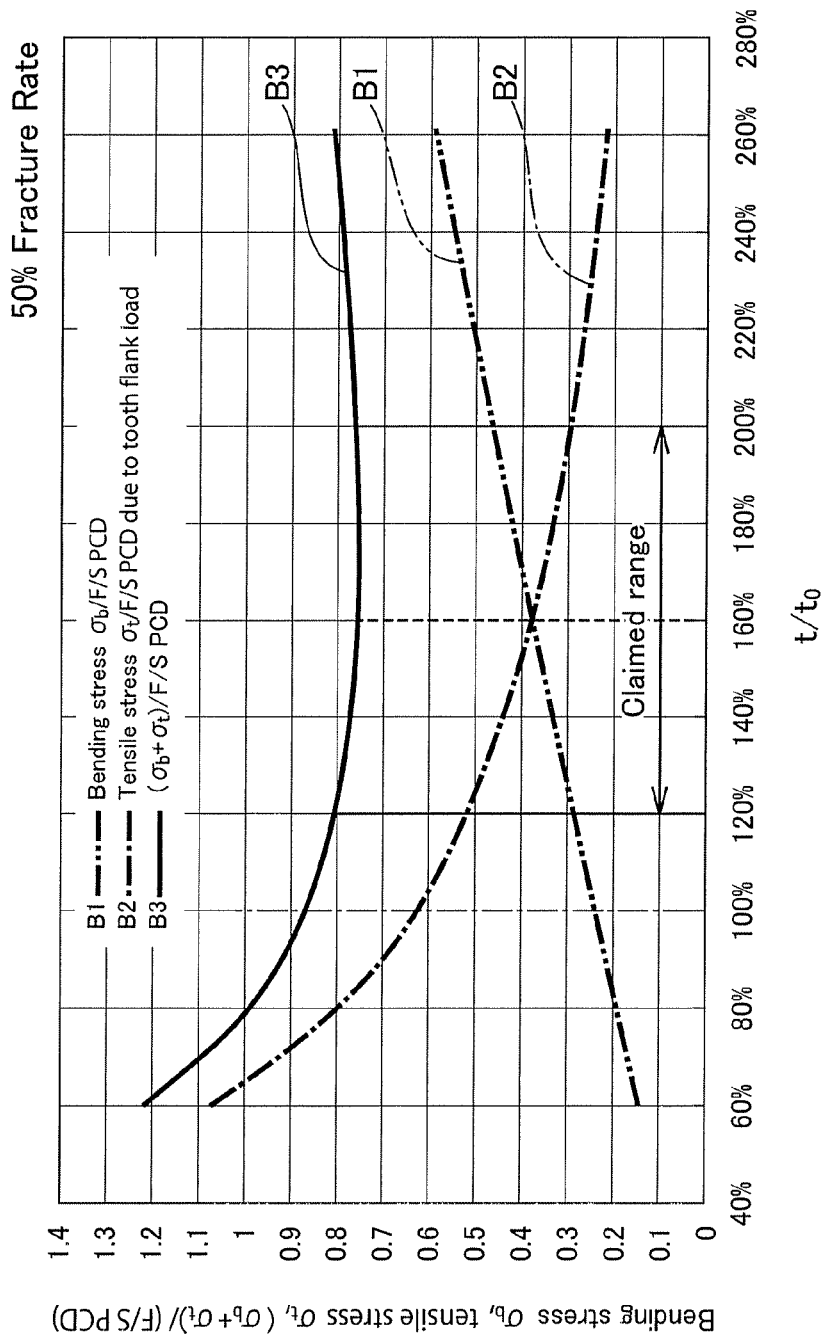
FIG. 3 is a graph showing the relationship between bending stress and tensile stress with respect to rim thickness.

FIG. 3 is a graph showing the relationship between rim thickness t and bending stress σb, tensile stress σt and total stress (σb+σt) produced in the flat type wave gear device. The horizontal axis is the ratio (%) between the rim thickness t of the flexible external gear and rim thickness to of the conventional design model shown in FIG. 1, and the vertical axis is the ratio between bending stress σb, tensile stress σt, total stress (σb+σt) and the PCD (pitch circle diameter) of the flexible external gear.

As shown by line segment B1, bending stress σb increases more or less in proportion to the rim thickness, but as shown by line segment B2, the tensile stress σt decreases as the rim thickness increases. Due to that, as shown by line segment B3, although the total stress (σb+σt) decreases down to a rim thickness that is in the order of 160% of the rim thickness of the conventional design model, after that it gradually increases, although the increase is slight.

In terms of the rim thickness of the conventional design model (at the 100% point on the horizontal axis), the total stress is high, there being no optimization of the rim thickness. In contrast, in the range of the present invention (the range of 120% to 200% on the horizontal axis), the total stress range is held to a minimum, showing the optimization of the rim thickness. In particular, in the case of the lower limit value of 120% or below, the total stress increases, showing that it is desirable for the rim thickness t to be not less than that value.

Figure 4:
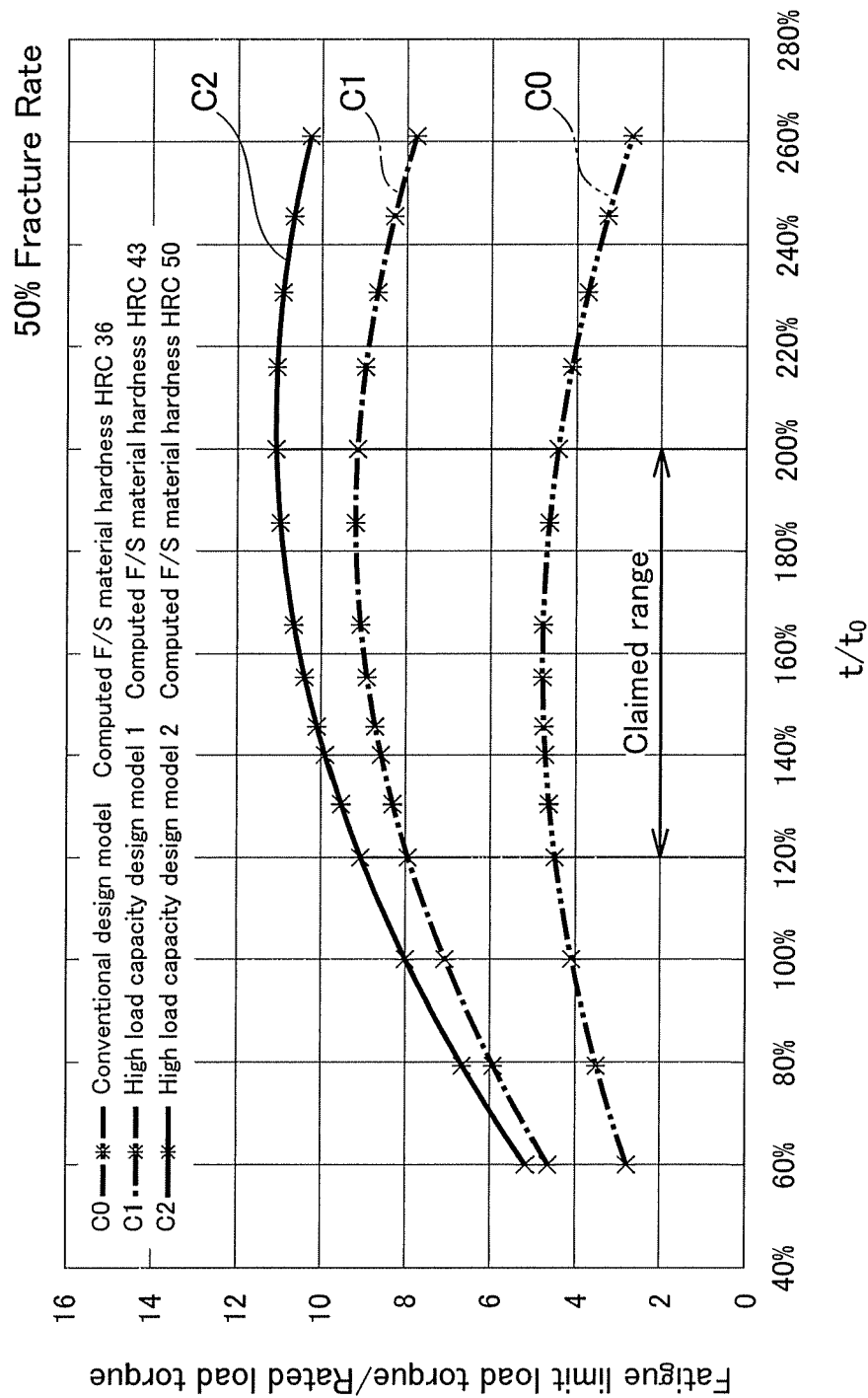
FIG. 4 is a graph showing the relationship of fatigue limit load torque with respect to rim thickness.

Next, FIG. 4 is a graph showing the results of computing the tooth root strength of the flexible external gear when the rim thickness of the gear is varied. As in FIG. 3, the horizontal axis is the ratio (%) between the rim thickness t of the flexible external gear and rim thickness to of the conventional design model shown in FIG. 1, and the vertical axis is the ratio between the flexible external gear tooth root fatigue limit load torque and rated torque. In the graph, curve C0 is when the material hardness HRC is 36, curve C1 is when the material hardness HRC is 43, and curve C2 is when the material hardness HRC is 50.

As can be seen from these curves, the fatigue limit load torque increases with the increase in the rim thickness, but when the rim thickness exceeds a certain value, there is a reversal and the fatigue limit load torque decreases. The maximum value of the fatigue limit load torque appears in the range of the present invention (the range of 120% to 200% on the horizontal axis). Also, at a higher material hardness HRC, the point at which the maximum value of the fatigue limit load torque appears moves towards the thicker rim side, with the point at which the maximum value appearing when the material hardness HRC is in the order of 50 being more or less at the 200% point on the horizontal axis. At the present time, it is difficult to process a flexible external gear having radial flexibility when material is used having a material hardness HRC that exceeds 50. Therefore, a rim thickness can be set to produce the maximum fatigue limit load torque, employing the hardest material that can be used in practice up to the 200% that is the upper limit in the present invention.

From the graph of FIG. 4, it can also be seen that the fatigue limit load torque can be vastly improved compared to that of the conventional design model (curve C0 in FIG. 4), by prescribing the rim thickness as per the foregoing, and by manufacturing the flexible external gear using a material that is harder than the HRC of 36 normally used before.

Figure 5:
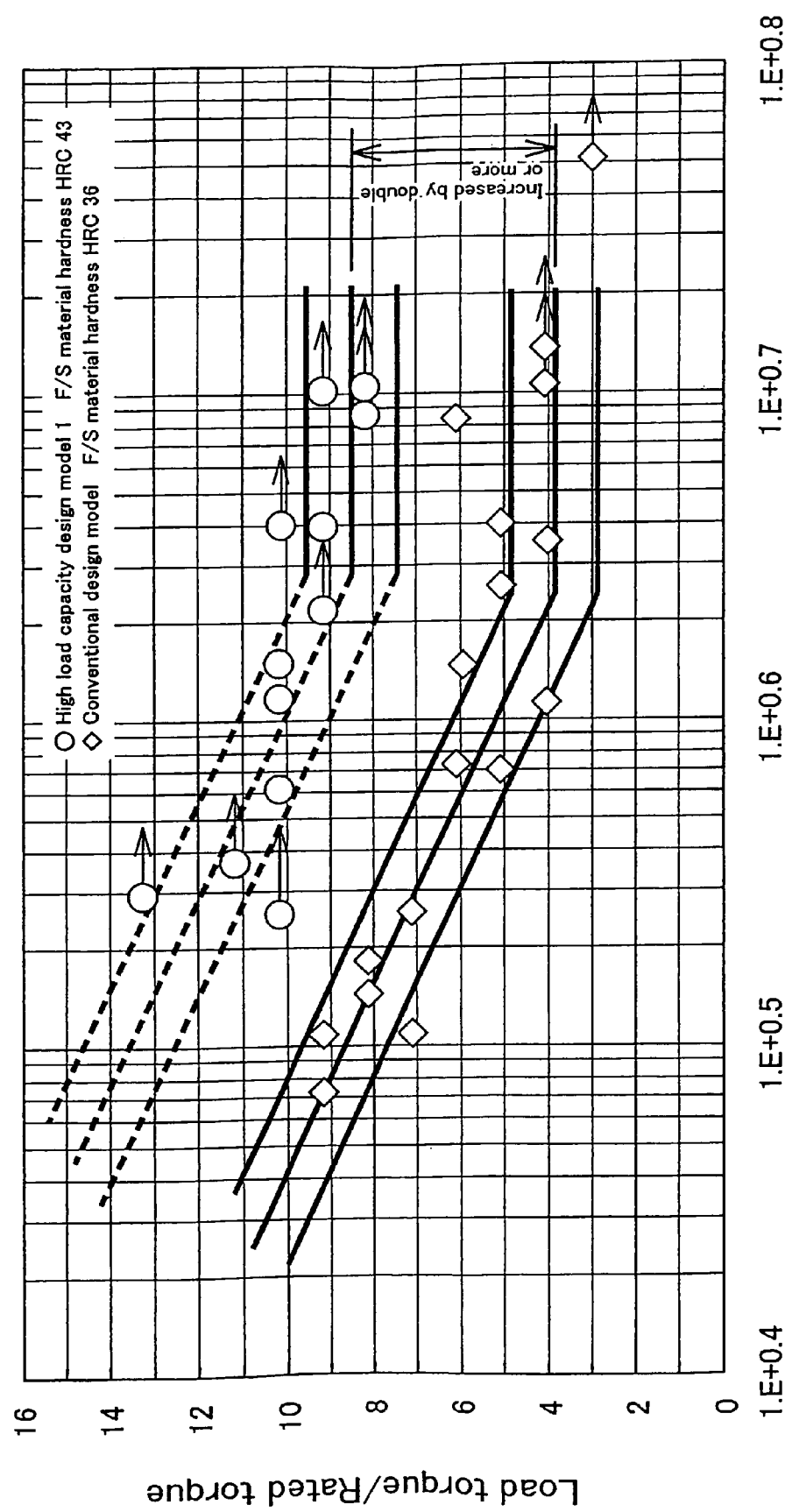
FIG. 5 is a graph showing the relationship number of bendings and the fatigue limit load torque of the tooth root.

For example, it was confirmed that using a conventional design model with the rim thickness denoted by the 145% broken line A2 in FIG. 2 and a material hardness HRC of 43 improved the fatigue limit load torque more than two-fold compared to the conventional design model (having a material hardness HRC of 36). FIG. 5 is a graph showing an example of the results of this experimental test. In this diagram, the horizontal axis is the number of times the flexible external gear is bent, and the vertical axis is the ratio between load torque and rated torque. The square points are plots of test values of the conventional design model, and the round points are plots of test values obtained using the present invention.

In the conventional case, the fatigue limit strength of the flexible external gear increases up to a flexible external gear material hardness of HRC 40, but when the material used exceeds that hardness, the fatigue limit strength was seen to decrease. However, as shown in FIGS. 4 and 5, it was confirmed that the fatigue limit strength of the flexible external gear could be increased even when the material hardness HRC was 40 or more. Based on the present inventors' test, it was confirmed that when a rim thickness according to the present invention is used, it is preferable to use a material hardness HRC within the range 40 to 50, and particularly preferable to use a material hardness HRC within the range 40 to 43.

The invention claimed is:

1. A flat type wave gear device comprising:
an annular rigid internal gear, an annular flexible external gear disposed inside the rigid internal gear, and a wave generator for flexing the flexible external gear into an elliptical shape to cause it to partially mesh with the rigid internal gear and for circumferentially moving positions at which the gears mesh, wherein:
when d is an amount of radial flexing at a major axis location of a rim neutral circle of the flexible external gear flexed into an elliptical shape and
t is rim thickness of the flexible external gear, then $$(0.5237 \, Ln(R)-1.32)d \leq t \leq (0.8728 \, Ln(R)-2.2)d$$

when reduction ratio R of the wave gear device is less than 80, and $$(1.5499 \, Ln(R)-5.8099)d \leq t \leq (2.5832 \, Ln(R)-9.6832)d$$

when reduction ratio R of the wave gear device is 80 or more;
wherein Ln is a natural logarithm whose base is Napier's constant e.

2. The flat type wave gear device according to claim 1, characterized in the flexible external gear having a material hardness HRC value within a range of 40 to 50.

* * * * *